Feb. 27, 1923.
O. L. WHITTLE
LINK BELTING
Filed June 11, 1920
1,446,730
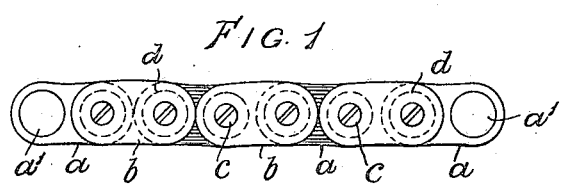
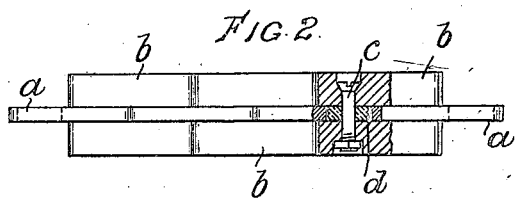
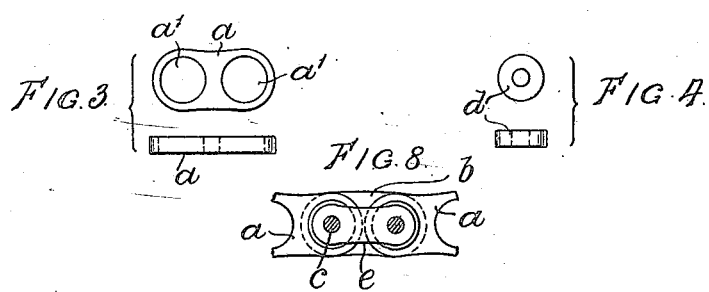
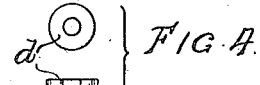
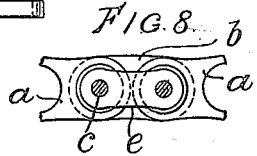
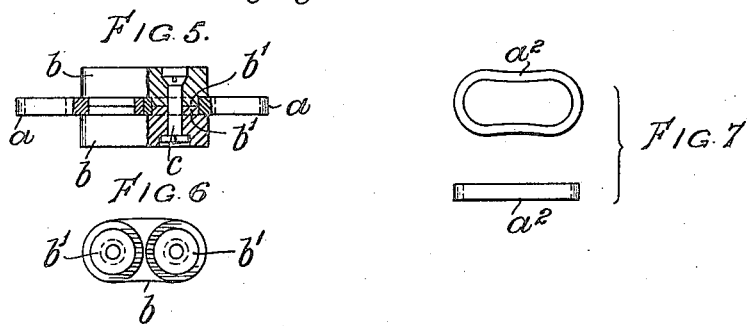
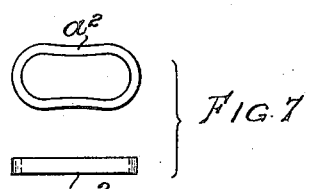
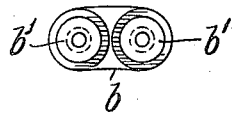
INVENTOR:
Oscar Lyon Whittle
BY Wm Wallace White
ATT'Y.

Patented Feb. 27, 1923.

1,446,730

UNITED STATES PATENT OFFICE.

OSCAR LYON WHITTLE, OF WARRINGTON, ENGLAND.

LINK BELTING.

Application filed June 11, 1920. Serial No. 388,130.

*To all whom it may concern:*

Be it known that I, OSCAR LYON WHITTLE, a subject of the King of Great Britain, residing at Victoria House, Wilderspool, Warrington, in the county of Lancaster, England, have invented new and useful Improvements in and Relating to Link Belting, of which the following is a specification.

My invention relates to improvements in the manufacture of link belts of the type which is composed of alternate links of metal and of leather or equivalent material, and particularly to the type patented under No. 13,412 of 1904 in which the metal links were each formed with two projecting pins for connecting together the links of leather or other analogous material.

The object of my improvement is to reduce the cost and to make a lighter and a more efficient belt by substituting for the metal links and projecting pins, metal links with a hole near each end or alternatively simple loops in conjunction with leather or analogous bearing bushing, which will reduce wear and consequent stretch in the belt.

The improved belt consists of say leather links with leather bushings placed, embossed or otherwise formed between each pair of links at each end. The links with the bearing bushings are held together by means of screws, rivets or bolts which pass through these links and the bearings. Between this set of links and round the bearings on each end of two of the links are placed the metal links with double holes or simple loops to join the two sets of links into a continuous belt. The bearings as already stated may be separate from and attached to the outer leather links or they may be embossed, turned or otherwise formed as integral parts of the links. The bearing bushings and one set of links may be made of leather or other analogous material or of wood or vulcanized fibre or other suitable material in any combination desired.

In the accompanying sheet of drawings—
Fig. 1 is a side elevation and Fig. 2 a plan, partly sectional, of my improved belt composed of leather links held together by metal links with leather bearing bushings. Fig. 3 shows one of the metal links in elevation and plan and Fig. 4 shows one of the leather bearing bushings also in elevation and plan. Fig. 5 is a similar view to Fig. 2 but showing the alternative construction in which the leather bushings are embossed on the leather links instead of being separate parts as in the first construction. Fig. 6 is a detail view showing the inside of one of the leather links. Fig. 7 is a detail view showing in two views one of the metal loops which may be employed instead of the metal link shown in Fig. 3 and Fig. 8 is a fragmentary side view illustrating a modified form of belt in which a supplementary metal link is employed.

In these views—$a$ designates the metal links each of which is formed with a hole $a'$ near each end as clearly shown in the detail view Fig. 3; or alternatively the metal links may take the form of simple loops $a^2$ as shown in Fig. 7; but these are less efficient than the links $a$ on account of their liability to draw out and so allow the belt to stretch; $b$ the series of leather links; and $c$ screws, bolts or rivets.

According to my invention in conjunction with the metal links I employ leather bearing bushings for the screws or equivalents $c$. These leather bearing bushings $d$ may be separate parts as shown best in Figs. 2 and 4 or they may be embossed, turned or otherwise formed as integral parts of the leather links $b$ as shown best in Figs. 5 and 6 where such embossed portion is marked $b'$.

In combination with either construction of improved belt as herein described I may in addition employ small metal links $e$ in order to prevent stretch but I lay no claim to such links per se as they merely form an additional known feature employed by me in combination with my improved construction of belt as above described, and are only rendered practicable by the leather bearing bushings which take the main strain and so prevent undue cutting and wear of the pivots.

The belts may be made of any width by multiplying the rows of links and bearings and by placing between the requisite rows the metal links with double holes or the simple loops.

The improved belts are particularly suited to the driving of dynamos, fans and motor cycles as well as other machinery.

By leather I include other analogous material such as rubber, vulcanized fibre or wood and further, other materials may be incorporated in the leather set of links.

What I claim as my invention and desire to secure by Letters Patent is:—

A link belt, comprising a series of metallic links, a series of non-metallic links at each side of said metallic links, non-metallic bushings formed integral with said side series of links and extending into the metallic links, and pivot members passing through said non-metallic links and bushings for securing the links together.

In testimony whereof I have signed my name to this specification.

OSCAR LYON WHITTLE.

Witnesses:
 C. H. WHITE,
 HERBERT ROWLAND ABBEY.